April 5, 1949.  R. H. ZINKIL ET AL  2,466,652
COVER AND MOUNTING THEREFOR
Filed Oct. 26, 1945  2 Sheets-Sheet 2
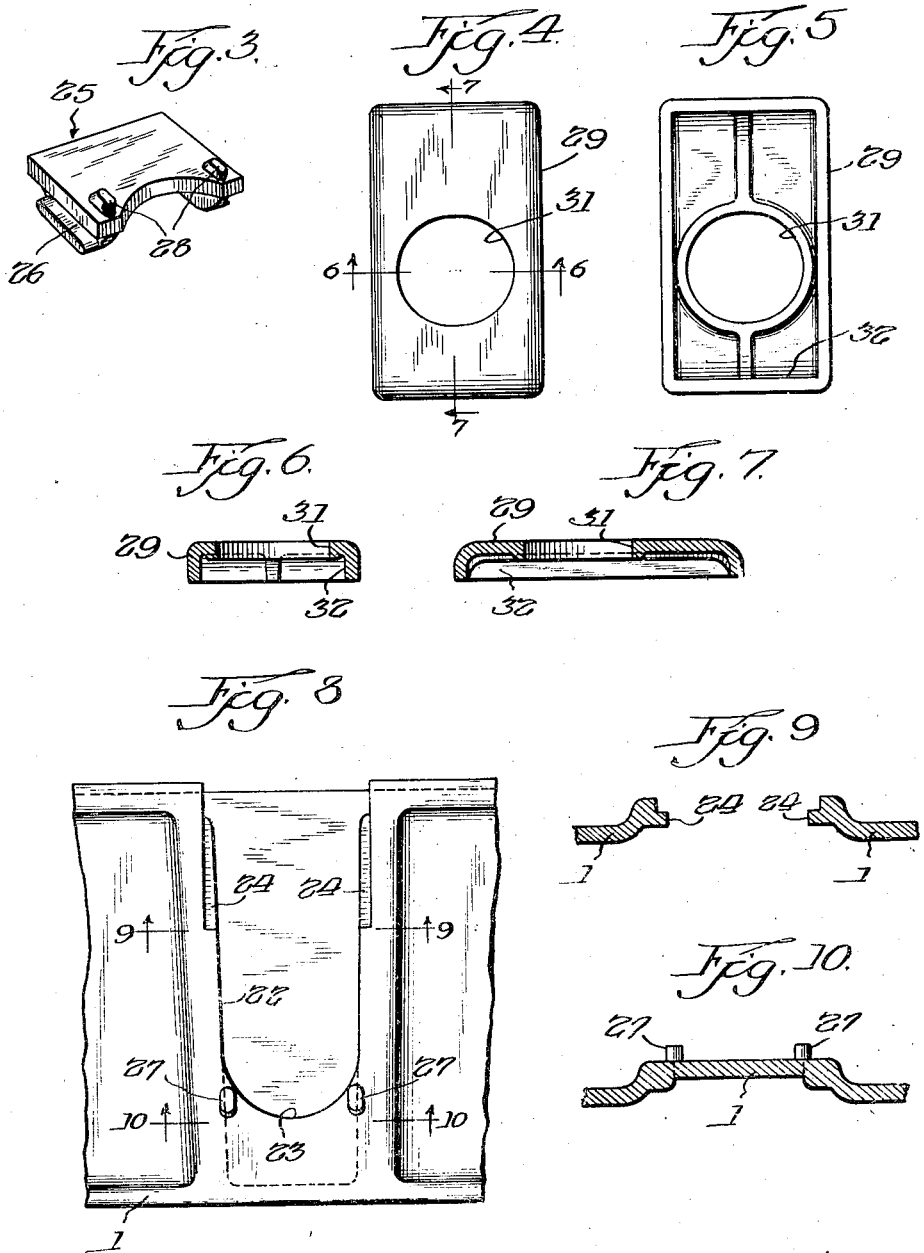
Inventors:
Roy H. Zinkil,
Edward A. Fredrickson,
James R. Turek.
By Joseph O. Lange
Atty.

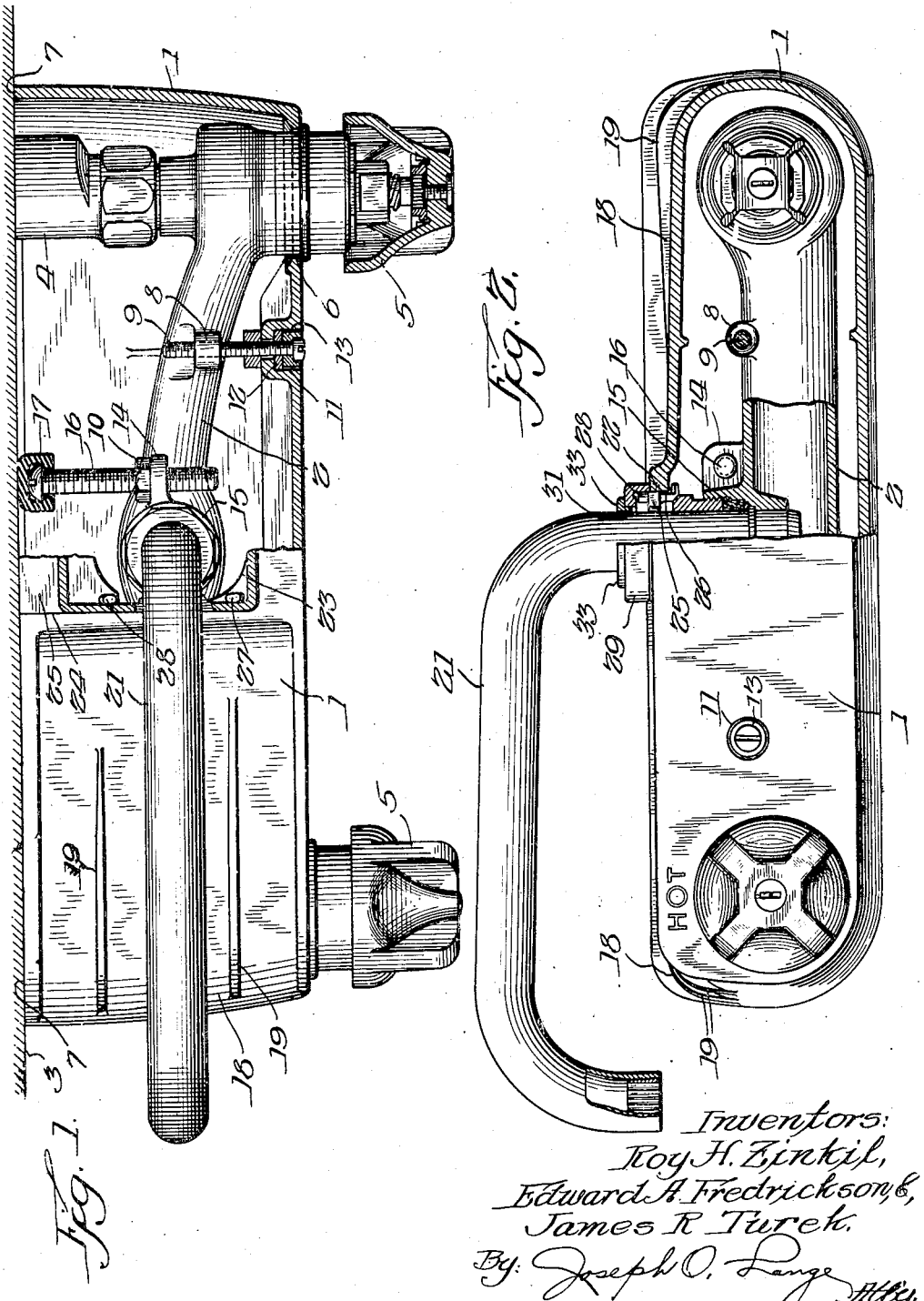

Patented Apr. 5, 1949

2,466,652

UNITED STATES PATENT OFFICE 2,466,652

COVER AND MOUNTING THEREFOR

Roy H. Zinkil, Oak Park, Edward A. Fredrickson, Chicago, and James R. Turek, Berwyn, Ill., assignors to Crane Co., Chicago, Ill., a corporation of Illinois Application October 26, 1945, Serial No. 624,898

12 Claims. (Cl. 137—111)

1

This invention relates to a cover and mounting therefor. More particularly it pertains to a novel cover for use with plumbing fixtures, such as kitchen sink faucets or the like.

This invention has particular importance in connection with a new and useful form of mounting for a cover in which the valve body and the supply connection to the plumbing fixture are concealed, leaving only exposed handles and the spout whereby the fixture may be operated in the conventional manner.

Heretofore one of the principal objections to the use of covers or escutcheons with plumbing fittings has been the inability to provide a secure mounting and also one which would remain relatively firmly established after being initially mounted or positioned upon the fixture.

Thus it is an important object of this invention to provide a novel cover, as for example of the type made of a suitable plastic material or a metal depending upon the nature of the installation in which the fitting may be relatively easily installed and also subsequently repaired or inspected.

Another object is to provide a slide member having guide means or lugs on top for the purpose of guiding a preferably rectangular spout escutcheon, whereby the lugs on the slidable member serve to prevent rotation of the escutcheon and also to provide in and out adjustment for what is termed roughing-in as hereinafter described in greater detail.

A further object is to provide a novel form of an enclosing cover having a pair of soap dishes so arranged that they are preferably an integral part of the cover.

A further object is to provide a novel cover having fastening means within recessed openings in the cover whereby a felt washer or the like and a plastic bushing may be positioned between the felt washer and a screw head so as to uniformly distribute the bearing load of the screw after securely fastening the cover to the fitting. The instant invention also provides a construction which controls the pull-up of the screw, so as to avoid undue strains being applied to the cover proper.

A still further object is to provide a novel form of cover assembly in which a retaining washer may be assembled on the fastening screw against the inside of the cover to prevent the loss of the screw in removing the cover while servicing the faucet or similar device.

Other objects and advantages will become readily apparent upon proceeding with the specification read in light of the accompanying drawings, in which Fig. 1 is a fragmentary sectional assembly view in plan of the novel cover assembled with a double pattern kitchen sink faucet.

Fig. 2 is a front fragmentary sectional assembly view of the structure described in connection with Fig. 1.

Fig. 3 is a perspective view of the novel slidable cover.

Fig. 4 is a plan view of the spout escutcheon.

Fig. 5 is an underside view of the escutcheon in Fig. 4.

Fig. 6 is a sectional view of the escutcheon taken on the line 6—6 of Fig. 4.

Fig. 7 is a sectional view of the escutcheon taken on the line 7—7 of Fig. 4.

Fig. 8 is a fragmentary plan view of the novel cover showing the slotted arrangement.

Fig. 9 is a fragmentary sectional view taken on the line 9—9 of Fig. 8.

Fig. 10 is a fragmentary sectional view taken on the line 10—10 of Fig. 8.

Similar reference characters refer to similar parts throughout the several views.

Referring now to Fig. 1, a combined soap dish and cover 1 is suitably apertured and recessed to be receivable over a double kitchen sink faucet generally referred to as 2. The details of the kitchen sink faucet have been intentionally omitted because the interior structure is similar to that covered in co-pending patent application identified as Serial No. 535,728, filed May 15, 1944, and has no bearing upon the application of this invention. The numeral 3 designates the front wall of a room to which the fitting is attached with the usual supply lines for hot and cold water as indicated at 4 and provided with the operating handle 5 to open and close the valves, a portion of the fitting extending through the aperture 6. The end portion of the cover 1, as at 7, abuts against the outer surface of the wall 3. The cover is attached to the faucet at two places preferably by means of the tapped lugs 8 integral with the faucet body and threaded to receive the attaching machine screw 9. The front face of the cover 1 is preferably recessed as at 11 to receive the cushioning washer 12 and with the screw washer 13 superposed thereover, the latter member being recessed to receive the head of the screw 9; the cushioning washer 12 may be of felt or like material to absorb the pull up load. In order to locate the sink faucet 2 properly with relation to the room wall 3 it is preferable to provide a stop lug 14 integral with the faucet shank 15 threaded to receive a machine screw 16, the head of the screw 16 being preferably shrouded in the cap 17 which may be made of rubber or other suitable material. When the adjustment has been completed relative to positioning the faucet body 2 suitably distanced from the wall 3 for the desired roughing-in dimension by desired rotation of the screw 16, the locknut 10 holds the said screw against rotation. The latter element is a significant contribution in that it enables the fitting to be located relatively accurately with respect to the wall 3 of the room and at the same time constitutes an effective means to eliminate any undue strain on the cover 1. The upper portion of the cover may be suitably designed to function as a double soap dish as indicated at 18 in Fig. 2, being provided with the ribs 19 upon which the soap rests.

It should of course be apparent that in order to position the cover 1 firmly against the wall 3 it is necessary to move the said cover past the shank of the spout 21. As shown more clearly in Fig. 8 the cover is slotted as at 22 and thus the shank of the spout 21 is moved longitudinally within the space provided by the slot 22 as far as needed in order to position the cover 1 in abutting contact with the wall 3. As will hereinafter be explained it is not necessary that the spout 21 shoulder against the rounded end portion 23 of the slot 22, although in some installations it may approximate a shouldering position at this location. At its rearward portion the slot 22 is suitably ribbed as at 24 to receive the cover slide 25 as shown more clearly in the perspective view of Fig. 3. The grooves 26 on each side thereof fit over the ribs 24 to provide for a sliding fit therebetween. At the forward end of the slot 22, the cover 1 is provided with the short vertically extending lugs 27, as shown more clearly in Fig. 8. On the upper surface of the cover slide 25 similar lugs 28 are provided of suitable height. The combined function of the lugs 27 and 28 is shown best in Fig. 1. It will be noted that the escutcheon 29 (see Figs. 4 to 7 inclusive) for the spout is suitably apertured as at 31 to pass over the spout 21. The underside of the spout escutcheon is recessed as at 32, the latter recessed portion being of sufficient height to accommodate with slight clearance, the respective lugs 27 on both the cover 1 and the lugs 28 on the cover slide 25. The transverse distance between the lugs is the same on both the cover slide and the cover and is slightly less than the width of the recess 32 shown in Fig. 6. However, the longitudinal position of the spout escutcheon 29, relative to the cover 1 may be varied depending upon the roughing-in required to properly position the faucet relative to the wall 3. Thus the desired flexibility is provided by means of the relative sliding engagement of the lugs 28 within the recess 32 of the escutcheon 29, wherein the latter mentioned lugs, insofar as the length of the recess 32 is concerned, engage one end portion while the lugs 27 engage the approximate opposite end portion of the said recess to thereby prevent the escutcheon 29 from rotating while the fitting is in use. The aperture 31 in escutcheon 29 is preferably of slight oval shape which will allow for side variations in manufacturing the faucet and at the same time limit the in and out movement of escutcheon relative to the shank of the spout 21. The escutcheon 29 is made with sufficient length so as to cover over any spaces between the cover slide 25 and the end of the slot 23 or any space between the shank of the spout 21 and the edge of the slot 24. As shown more clearly in Fig. 2 and primarily as a finishing member the spout collar 33 is applied and is supported upon the spout escutcheon 29, as shown.

It will thus be clear that a simple and sturdy means for attaching cover to a plumbing fitting such as a kitchen sink faucet has been provided which may be used either with metallic covers, or plastic or with synthetic compositions with equal advantage.

A preferred form of the embodiment has been shown only for purposes of illustration and it is the intention therefor that the patent granted hereon be limited only to the scope of the claims appended hereto interpreted in light of the prior art.

We claim:

1. In a cover for a faucet or the like, the cover being relieved to fit over the faucet, means for attachment of the cover to the faucet, apertured means provided on an upper portion of the cover for permitting a portion of the faucet to project therefrom, a removable cover slidable within said apertured means, an escutcheon adapted to fit over a portion of the said first named cover and the said slidable cover, projecting means provided by the said slidable cover and the said first named cover to restrain the escutcheon against rotation upon assembly of the covers.

2. In a cover for a sink faucet or the like, the combination including means on the faucet to keep the latter a predetermined distance from the mounting wall of a room, independent means on the cover for attachment of the said cover to the faucet, the said cover having a slot in the upper portion of the said cover open in a direction toward the wall, a second cover, movable within the said slot, an escutcheon supported by the said first named cover, lugs on both covers to engage a portion of the escutcheon whereby the escutcheon may be restrained against rotation.

3. In a cover for a sink faucet or the like, the cover being relieved to fit over the faucet, means provided for attachment of the cover to the faucet, means provided on an upper portion of the cover for accommodating a portion of the faucet, a slidable cover cooperating with the accommodating means, an escutcheon positioned over at least a portion of the first cover and the said slidable cover, means on an upper surface portion of the said slidable cover and the first named cover cooperating with the said escutcheon to restrain the escutcheon against rotation.

4. In a cover for a faucet or the like, the cover being hollow and slotted to fit over the faucet, means carried by the cover for attachment of the latter member to the faucet, a removable cover slidable within the slotted portion of the first named cover, a hollow plate adapted to fit over at least a portion of the said first cover and the slidable cover, means jointly cooperating with the said first named cover and the said slidable cover to hold the said hollow plate against rotation.

5. In a cover of the character described, the combination including a member having a projecting portion, the said cover being hollow and having a slotted aperture to accommodate said projecting portion, a slidable cover in said slotted aperture, an escutcheon positioned over a portion of the slotted aperture, means on both covers cooperating to restrain the escutcheon against rotation, said latter means cooperating with the said covers when the said slidable cover is in predetermined position relative to said first named cover to engage a portion of the said escutcheon, holding means in a wall portion of the said first named cover for retaining the latter member relatively fixed with respect to the first named member.

6. In a cover for a sink faucet or the like, means on the cover to keep the latter member at a predetermined distance from the mounting wall of a room, resiliently mounted means on the cover for attachment of the latter member, the cover having a slot in the upper portion open in a direction toward the wall, a second cover slidably movable within the slot, an escutcheon for the covers, projections on the first and second covers to engage a portion of the said escutcheon, one cover being relatively movable to the other cover whereby the position of the escutcheon employed may be varied while being held against rotation by the assembly of the said covers.

7. In a fitting cover, the combination including a fitting or the like having a projecting portion, the said cover having a slotted opening to receive the fitting projecting portion, a second cover for a portion of the slotted opening, an escutcheon positioned over at least a portion of the said slotted opening, projections on both of the said covers to restrain the escutcheon against rotation, adjustable means in a wall portion of the said first named cover for retaining the latter member fixed relative to the fitting.

8. The combination of a cover and soap dish for a sink faucet or the like, threaded means on the cover to maintain the faucet and cover a predetermined distance from a wall mounting, means on the cover for attachment of the said cover to said sink faucet or the like, the cover having a slot open in the direction toward the wall, a second cover slidably movable within the said slot of the first named cover, an escutcheon for the cover, joint means on the said first cover and the said slidable cover engaging the said escutcheon, the slidable movement of the said second cover allowing for predetermined variation in distance to be maintained between the said escutcheon engaging means whereby the said escutcheon may be securely retained against rotation, an upper portion of the said first named cover being suitable for soap retaining means.

9. A cover of the character described for a faucet or the like, the cover enclosing the faucet except for such portions exposed for the operation of the said faucet, slotted means on the cover providing an aperture for a spout projection from the faucet, a second cover movable within the aperture accommodating the said spout projection, an escutcheon fitting over at least a portion of the said cover and the said second cover, lugs suitably spaced on both the said first named cover and the said slidable cover for prevention of rotation of the said escutcheon relative to the said covers, the said escutcheon having suitable means to receive the lugs of the said covers.

10. In a cover for a faucet or the like, the cover enclosing the said faucet except for such portions exposed for its operation, apertured means provided by the cover for a spout projection from the faucet, a second cover member slidably movable within the apertured means of the first named cover and relieved to complete with the first named cover the aperture for the spout projection, an escutcheon fitting over a portion of the covers, means suitably spaced on the said covers for positioning the said escutcheon nonrotatably relative to the said covers.

11. In a cover for a faucet or the like, the cover being relieved to fit over the faucet, means for attachment of the cover to the faucet, apertured means provided on an upper portion of a cover for permitting a portion of the faucet to project therefrom, a removable cover slidable within said apertured means, an escutcheon adapted to fit over a portion of the said first named cover and the said slidable cover, adjustable means on the faucet to maintain the cover attachment means fixedly relative to a wall or the like.

12. In a cover for a faucet or the like, the cover being relieved to fit over the faucet, means for attachment of the cover to the faucet, apertured means provided on an upper portion of a cover for permitting a portion of the faucet to project therefrom, a removable cover slidable within said apertured means, an escutcheon adapted to fit over a portion of the said first named cover and the said slidable cover, means on the faucet to keep the latter a predetermined distance from the wall of a room.

ROY H. ZINKIL.
EDWARD A. FREDRICKSON.
JAMES R. TUREK.

REFERENCES CITED

The following references are of record in the file of this patent:

UNITED STATES PATENTS

| Number | Name | Date |
| --- | --- | --- |
| 1,578,934 | Stern | Mar. 30, 1926 |
| 1,743,804 | August | Jan. 14, 1930 |
| 1,754,217 | August | Apr. 15, 1930 |